June 8, 1954
J. GONZALEZ
2,680,435
DRILLING DEVICE
Filed Aug. 21, 1952
2 Sheets-Sheet 1
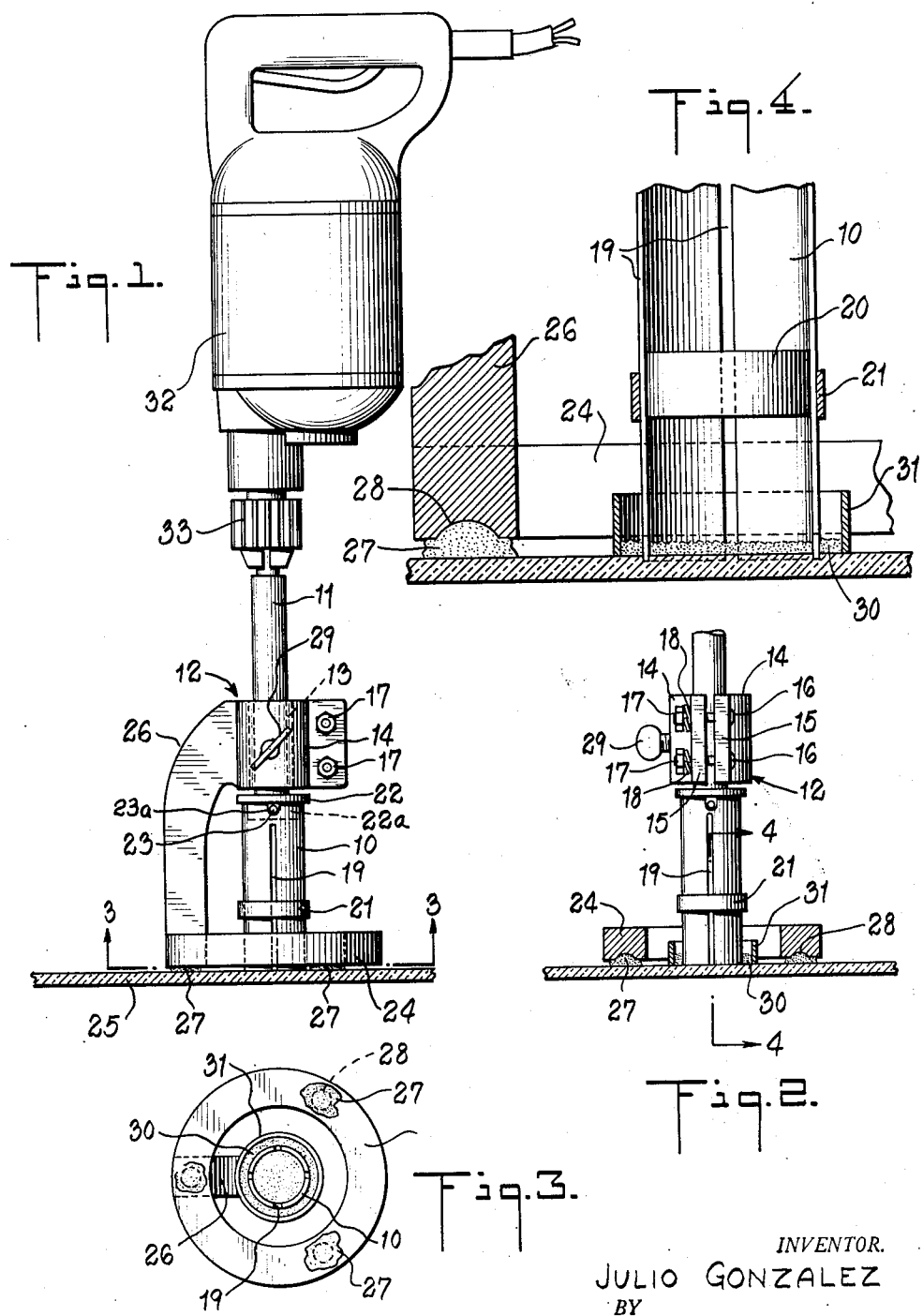
INVENTOR.
JULIO GONZALEZ
BY
Kenyon & Kenyon
ATTORNEYS June 8, 1954
J. GONZALEZ
2,680,435
DRILLING DEVICE
Filed Aug. 21, 1952
2 Sheets-Sheet 2
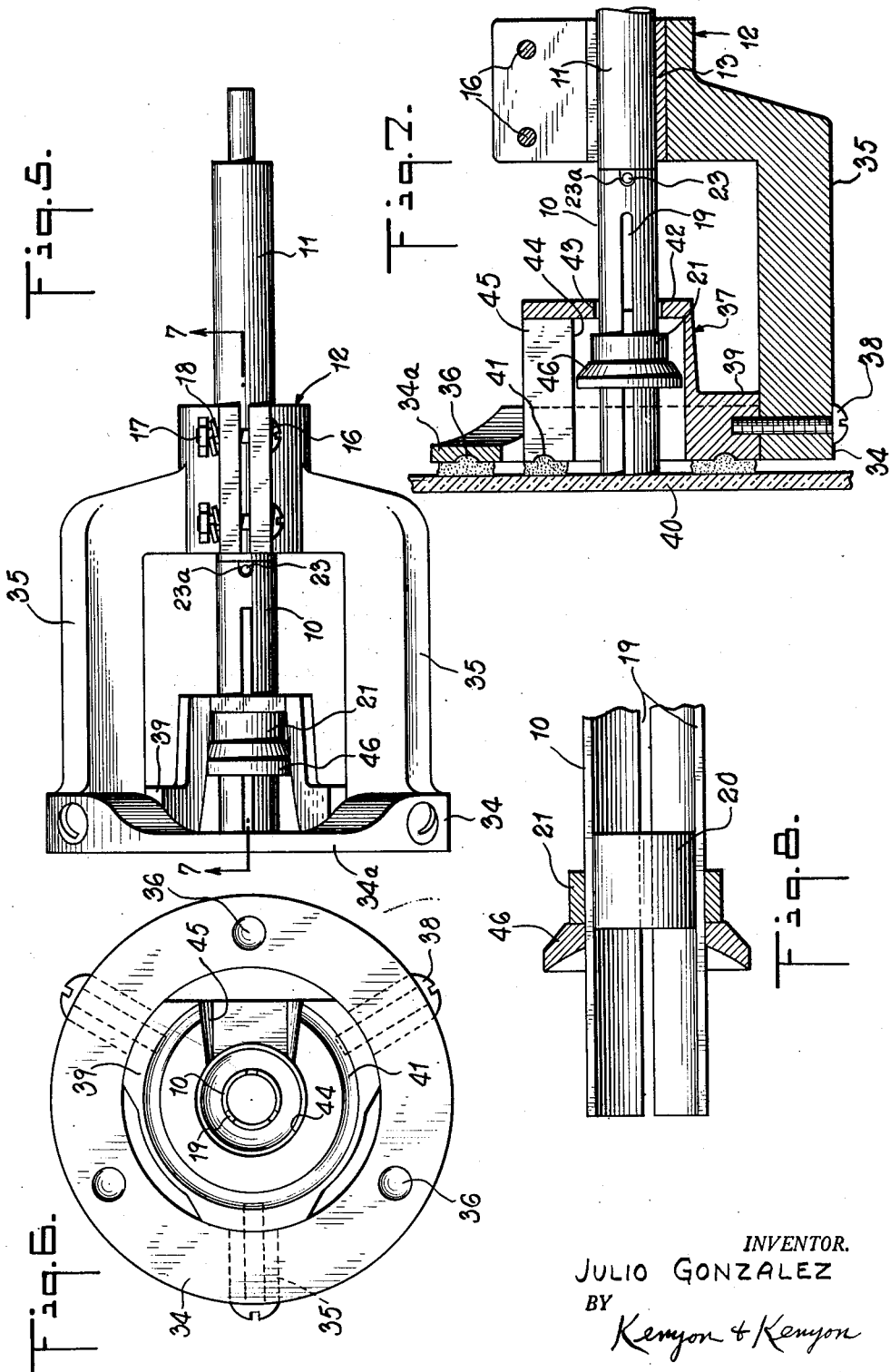
INVENTOR.
JULIO GONZALEZ
BY
Kenyon & Kenyon
ATTORNEYS

Patented June 8, 1954

2,680,435

UNITED STATES PATENT OFFICE 2,680,435

DRILLING DEVICE

Julio Gonzalez, Jersey City, N. J.

Application August 21, 1952, Serial No. 305,559

6 Claims. (Cl. 125—20)

This invention relates to drilling devices and while devices embodying this invention may be used for many drilling purposes the devices of this invention are especially suitable for the drilling of holes in hard, rigid bodies such as glass, vitreous tiles, stone and the like.

In my copending application Serial No. 98,934 for "Drilling Machine" I have disclosed a drilling machine which is especially suited for the drilling of holes in glass, vitreous tile and other similar hard rigid bodies. The drilling machine disclosed in my copending application, while relatively small and light in weight, is particularly adapted for the drilling of holes in pieces which can be laid on a work table or other similar support during the drilling operation. However, it is frequently desirable to drill holes in glass, vitreous tile or the like which is installed in a structure and which cannot be conveniently detached and placed on a work table. The drilling device of this invention is especially suited for enabling holes to be successfully drilled in glass, vitreous tile and the like whether the piece in question is or is not installed in a permanent position. Moreover, the drilling device of this invention is such that it can be readily carried by a mechanic in a tool kit and is also suitable for use by the general public since the device can be economically made and sold and is adapted to be used with any type of conventional means for rotating a spindle such as a portable electric drill.

As mentioned in my aforesaid copending application the drilling of holes in hard rigid bodies such as sheets of glass, vitreous tile or the like has occasioned difficulty. Even in the case of large, expensive and heavy machines designed for the purpose there has been excessive breaking or cracking of the article being drilled. This has been particularly the case in attempt to drill holes in close proximity to each other or in close proximity to the edge of the article being drilled. If attempt is made to drill holes in such articles as glass, vitreous tiles and the like using a machine such as a portable electric drill it is a matter of extreme difficulty to do so successfully. According to this invention a relatively small and easily handled device is afforded whereby holes can be successfully drilled in hard rigid bodies whether or not such bodies are permanently installed in a structure or whether or not they are installed horizontally or vertically.

It is an object of this invention to provide a portable drilling device which is especially adapted for use in drilling of holes in hard rigid bodies such as glass, vitreous tile and the like. It is a further object of this invention to provide a portable drilling device which is adapted to be used in combination with any suitable source of power such as a portable electric drill or the like. Further objects of this invention relate to the provision of a drilling device which is adapted not only for shop use but for use wherever objects to be drilled may be disposed in permanent installations. A further object of the preferred embodiments of this invention relates to the provision of a drilling device which is adapted to drill holes in a piece of glass, vitreous tile or the like which is disposed vertically or at any other angle to the horizontal.

Further purposes, features and advantages of this invention will be apparent in connection with the following description of certain illustrative embodiments of this invention which are shown in the accompanying drawings, wherein Fig. 1 is a side elevation of a drilling device embodying this invention as disposed on a work piece and in combination with a portable electric drill;

Fig. 2 is a front elevation of the drilling device of this invention which is shown in Fig. 1 with certain parts thereof shown in section;

Fig. 3 is a view of the drilling device of this invention taken from underneath along the line 3—3 of Fig. 1;

Fig. 4 is a sectional side elevation taken on the line 4—4 of Fig. 2 and on a substantially larger scale;

Fig. 5 is a top view of an alternative embodiment of this invention which is especially adapted for use with the spindle and drill bit in the horizontal position as shown in this figure;

Fig. 6 shows the end of the device shown in Fig. 5 which is adapted to be disposed in contact with the work piece;

Fig. 7 is a side sectional elevation of the device shown in Fig. 5 taken on the line 7—7 of Fig. 5, and Fig. 8 is an enlarged detail sectional view of a portion of the drill bit used in the embodiment shown in Figs. 5, 6 and 7 showing the annular collar carried thereby.

The embodiment of this invention which is shown in Figs. 1 to 4 is intended primarily for use in the drilling of holes in a work piece composed of glass, vitreous tile or the like which is disposed substantially horizontally, and this embodiment will be first described.

The drill bit 10 is secured in axial alignment to the end of the spindle 11 which in turn is rotatable in the bearing which is indicated generally by the reference character 12 and which maintains the spindle 11 in fixed axial alignment during the rotation of the spindle. The bearing 12 permits the spindle to be moved longitudinally with respect thereto during rotation of the spindle so that the spindle 11 and the drill bit 10 carried thereby may be advanced as the cutting end of the drill bit cuts into the work piece during the drilling of a hole.

The drilling device of this invention is adapted for use in connection with any type of drill bit and bearing construction. However, for the reasons mentioned in my aforesaid application Serial No. 98,934 it is highly desirable to use in the drilling device of my present invention the bearing construction which is disclosed in said application and the bearing construction shown in the drawing for illustrative purposes is of this type. Thus, the bearing 12 comprises a bushing 13 which is held within trough portions of the arms 14 which emanate from a common support and which are spaced apart at their extremities so that the arms can be drawn together. The arms 14 afford a constrictable bushing holder for the bushing 13 and the bushing 13 has a longitudinally disposed slot therein, which may as shown be in alignment with the gap between the ends of the arms 14, so that the bushing is also constrictable when the bushing holder is constricted. The ends 15 of the arms 14 are such that they can be drawn together by the bolts 16 so as to constrict the bushing therewithin. Between the nuts 17 and the arm end 15 adjacent thereto are spring members 18 which conveniently can be supplied by the use of conventional lock washers which consist essentially of a short spring. The spring means 18 resiliently apply force so as to tend to draw the ends 15 of the arms 14 together for constricting the bushing 13. The amount of contact pressure imposed between the interface 13 and the spindle 11 can be adjusted so as to be suitable for drilling while holding the spindle 11 in fixed axial alignment with reference to the bushing by adjusting the pressure brought to bear on the spring members 18 by the nuts 17. Upon the development of wear at the interface between the bushing 13 and the spindle 11 the spring members 18 act to automatically compensate for such wear with the result that the spindle is accurately held and does not develop excessive spindle wobble during the drilling of hundreds of holes without further adjustment of the nuts 17. However, such nuts 17 can be slightly adjusted whenever deemed desirable so as to adjust the tension imposed on the spring members 18 thereby permitting further long continued use of the bearing.

It is also highly desirable, although not essential to my present invention, to use the drill bit which is disclosed in my Patent No. 2,496,939. This drill bit is in the form of a simple tube and is characterized by longitudinally extending slots 19 which extend a substantial distance inwardly from the cutting end. In order that the portions of the tube between the slots may be firmly held in position adjacent the cutting end of the drill bit, holding means is employed in the form of an inner cylindrical plug 20 and an outer annular ring 21. When these parts are in the position shown in Fig. 4 their dimensions are such that the portions of the drill bit between the slots 19 are firmly held. However, the parts are merely maintained in position by friction, and by light tapping it is possible to move one of the parts, preferably the plug 20, relative to the other so as to be in non-overlapping position. When in such non-overlapping position the slight amount of permitted bending of the portions of the drill bit between the slots 19 permits each of the parts 20 and 21 to be freely moved longitudinally with reference to the drill bit. Ordinarily in practice the ring 21 is placed in the position desired at the outset of a drilling operation and the plug 20 is inserted from the back into the position shown in Fig. 4. After the cutting edge of the drill bit has been worn away these parts can be moved toward the rear end of the drill bit so as to adjust their spacing with reference to the cutting end of the drill bit.

The drill bit 10 may be secured to the spindle 11 in any suitable way. In the device as shown in the drawings there is a holding member 22, a portion 22a of which is shown by dotted lines in Fig. 1 and is adapted to fit within the inner surface of the drill bit. The drill bit may be held thereon in non-rotatable relation as by the slot 23 in the rear end of the drill bit which is adapted to cooperate with a pin 23a secured to the portion 22a of the member 22. The member 22 may be integral with the spindle 11, but preferably is detachably secured thereto so as to permit the interchanging of drill bits of different sizes.

According to this invention the bearing 12 is held in fixed position relative to the work piece by positioning member means rigidly connected with the bearing 12. In the exemplary embodiment shown the positioning member means is in the form of the annular member 24 which is disposed about and in substantially spaced relation with respect to the cutting end of the drill bit 10 when the parts are as disposed at the commencement of a drilling operation. The annular member 24 presents a surface which is adapted to be disposed in abutting relation to the surface of the work piece 25. The positioning member 24 is maintained in rigidly fixed relation with respect to the bearing 12 by the bracket 26 which is secured both to the bearing 12 and to the member 24 in rigid relation therewith preferably by the parts in question being in the form of an integral casting. When the member 24 is held against the surface of the work piece 25 its position as well as that of the bearing and the spindle and drill bit are determined and maintained constant. In the device shown the plane of the surface of the holding member 24 which is disposed in opposed abutting relation to the surface of the work piece 25 is perpendicular to the axis of the spindle 11 and to the drill bit 10, and the device is suitable for holding the spindle 11 and the drill bit 10 as so disposed with the axis of rotation thereof maintained in fixed alignment during the drilling operation.

While it is possible to hold the positioning member 24 against the surface of the work piece merely by manual pressure so as to hold steady the axis of rotation of the spindle 11 and of the drill bit 10 I have found that the holding of the member 14 firmly in position can be greatly augmented by disposing a plastic adhesive composition between the member 24 and the surface of the work piece 25. Such plastic composition is indicated at 27. While any type of adhesive plastic composition may be employed I have found that ordinary molding clay which consists essentially of a finely-divided clay powder or the like combined with sufficient mineral oil to provide a plastic putty-like composition is very well suited for the purpose. By use of such molding clay or similar adhesive compound a very strong grab between the positioning member 24 and the surface of the work piece can be provided which holds the device of this invention in very firmly secured position during a drilling operation. In order to facilitate the use of such adhesive composition the surface of the member 24 is preferably provided with recesses 28 which not only augment the bond but also enable the member 24 to be placed in as close proximity as possible to the work piece 25 while still affording the use of a substantial amount of the plastic adhesive composition for producing a firm bond. In the embodiment in Figs. 1 to 4 three such recesses 28 are employed disposed in substantially equally spaced relation about the drill bit 10. This provides what in effect may be referred to as three point support for holding the member 24 firmly in position with reference to the work piece 25. It is desirable that the surface of the member 24 which is used for positioning it with reference to the work piece 25 be disposed about the periphery of the drill bit throughout more than 180° of radial angle and so as to provide at least a three point support for holding the member 24 firmly in position. Any additional number of recesses 28 other than three may also be employed. Alternatively other recess means such as a groove may be employed.

In using the device shown in Figs. 1 to 4 a drill bit of desired size is secured to the end of the spindle 11. A plastic adhesive composition is then placed in each of the recesses 28 and the member 24 is pressed firmly against the surface of a work piece. To prevent the cutting end of the drill bit from contacting and possibly scratching the work piece during this operation the cutting end of the drill bit may be held out of contact with the surface of the work piece by use of the wing nut 29 which is in threaded engagement with the side wall of the bearing and the extremity of which is adapted to be tightened against the surface of the spindle 11 so as to temporarily hold the spindle in position until such time as it is desired to start drilling. After the member 24 has been made firmly adherent to the surface of the work piece in position such that the drill bit will drill a hole in desired location a suitable abrasive compound 30 may be distributed on the surface of the work piece around the cutting end of the drill bit. In order to confine the abrasive compound so that it may be more effectively used it is preferable to use a retaining member such as the ring 31 which is of somewhat greater internal diameter than the external diameter of the drill bit. This ring 31 may be placed on the surface of the work piece before the member 24 is pressed into position. After the abrasive compound 30 has been placed around the cutting edge of the drill bit the wing nut 29 can be loosened so as to permit the cutting end of the drill bit to come in contact with the surface of the work piece and drilling can be commenced.

For rotating the spindle 11 any suitable motor may be employed and for purposes of illustration the motor means employed may conveniently be an electric drill 32. The upper end of the spindle 11 in such case may be shaped so as to be accommodated by the bit holding means 33 which may be of any conventional type. After the drilling operation has been started the drilling device of this invention is such that the spindle and the drill bit are maintained steadily in fixedly aligned position and holes can be drilled without cracking or breaking notwithstanding the fact that the motor may be a manually held electric drill or the like.

As above mentioned the drilling device shown in Figs. 1 to 4 may be most advantageously used when the work piece 25 is disposed horizontally. In such case the abrasive composition 30 is maintained so as to facilitate the drilling operation. However, if the spindle and drill bit are held horizontally for drilling a hole in a work piece that is disposed vertically, then the abrasive composition becomes of greatly reduced effectiveness. In order to provide effectiveness which is substantially as great when the spindle and drill bit are disposed horizontally as when they are disposed vertically, the modification of this invention shown in Figs. 5 to 8 may be employed.

In the embodiment of this invention shown in Figs. 5 to 8 the drill bit 10, the spindle 11 and the bearing 12 may be as hereinabove described in connection with Figs. 1 to 4 and these parts have been indicated by like reference characters. However, in Figs. 5 to 7 a slightly different type of means for holding the drill bit 10 in secured relation to the spindle 11 as shown, the drill bit 10 being secured directly to the spindle 11 by fitting it over an end portion of the spindle 11 which is of somewhat reduced diameter, the drill bit being held against rotation by the recess 23 therein which cooperates with the pin 23a.

The embodiment shown in Figs. 5 to 8 likewise includes an annular holding member 34 which is essentially similar to the holding member 24 shown in Figs. 1 to 4 except that it includes a portion 34a of reduced thickness which is desirable for purposes which will be explained more in detail hereinbelow. The positioning member 34 is held in secured relation to the bearing 12 by the bracket members 35 which are rigidly secured to the bearing 12 and extend toward the cutting end of the drill bit in spaced relation thereto. In this particular embodiment three brackets 35 have been shown. However, a single bracket such as the bracket 26 shown in connection with Figs. 1 to 4 could alternatively be employed. In fact it is normally preferable to use single bracket means such as that shown in Figs. 1 to 4 inasmuch as the working parts are thereby rendered more accessible. If a single bracket is used it is normally preferable to locate this bracket opposite to the portion 34a of reduced thickness of the positioning member 34. The surface of the positioning member 34 which faces in the direction of the cutting end of the drill bit is provided with the recesses 36 for holding plastic adhesive composition material for the purposes which have been fully described hereinabove in connection with Figs. 1 to 4.

Disposed within the member 34 is a trough member which is indicated generally by the reference character 37. This trough member is held in place by the bolts 38 which pass through the positioning member 34 and substantially penetrate the flange 39 at the forward end of the trough member 37. The forward end of the trough member 37 presents a surface provided by the flange 39 which is substantially flush with the surface of the member 34 that is adapted to be disposed in opposed abutting relation with reference to the surface of the work piece 40. This surface presented by the trough member has the continuous recess 41 disposed substantially throughout the arcuate length of the surface for receiving the plastic adhesive composition. The plastic adhesive composition as it is disposed in this recess not only provides increased bonding grab between the device as a whole and the surface of the work piece but also provides an effective seal which prevents the abrasive composition from escaping from the region of the cutting end of the drill bit. The rear end of the trough member 37 is provided with a retaining wall 42 which has an aperture 43 therein to accommodate the drill bit.

The interior surface 44 of the trough member 37 is preferably substantially cylindrical except for the open upper portion or mouth 45 and is in proximate spaced relation to the periphery of the drill bit 10. The drill bit as shown in Figs. 5 to 8 is the type as hereinabove described which comprises the longitudinally extending slots 19 with portions of the tubular drill bit therebetween which are held firmly adjacent the cutting end of the drill bit by the plug 20 and the ring member 21. The plug 20 and the ring member 21 are disposed within the trough member 37. If an abrasive compound is placed in the trough member 37 the rotation of the drill bit does not result in the effective application of the abrasive compound at the cutting end of the drill bit so that the drilling of a hole in the work piece may be readily accomplished. I have found that if an annular collar member is secured to the periphery of the drill bit in proximate spaced relation with respect to the cutting end of the drill so as to dip into abrasive compound in the trough member the centrifugal action which results from rotation of the drill bit during drilling causes the abrasive material to be thrown upwardly with reference to the drill bit and so as to flow toward the cutting edge. Such a collar member 46 is shown secured to the periphery of the drill bit 10. The collar member 46 may be a separate part having essentially the same internal diameter as the ring 21 so that when the plug 20 is in the position shown the collar member 46 is frictionally held in place. If desired the collar member 46 may be secured to the ring 21. The periphery of the collar member 46 is such as to be in close proximity to the inner surface 44 of the trough member so as to effectively act on abrasive material contained in the trough member 37 and so as to prevent the abrasive material from flowing rearwardly and possibly escaping through the aperture 43 in the end wall 42 of the trough member.

The capacity of the collar member to urge the abrasive material upwardly and forwardly so as to substantially uniformly bathe the cutting end of the drill bit therewith may be very materially enhanced by inclining the surface of the collar 46 which faces the cutting end of the drill bit forwardly from adjacent the periphery of the drill bit to adjacent the periphery of the collar 46. Preferably this inner surface is made somewhat concave as shown. Such inclination of the surface of the collar 46 utilizes the centrifugal force set up during drilling so as to thrust the abrasive compound forwardly toward the cutting end of the drill bit. While one particular type of collar member has been shown which is adapted for use in connection with the particular drill bit disclosed, the collar member 46 can be attached to any other type of drill bit which may be employed using the drilling device of this invention. The collar member can be frictionally held thereon or if desired a set screw or the like may be employed to hold it in position.

In using the drilling device shown in Figs. 5 to 8 the trough member 37 is secured to the positioning member 34. The ring 21 and the collar member 46 are placed in desired position on the drill bit 10 and are maintained in this position by moving the plug 20 to the position shown in Fig. 8. The drill bit may then be secured to the end of the spindle 11 and this operation can be performed if desired while the spindle 11 is entirely removed from the bearing 12. A suitable plastic adhesive composition such as molding clay is then placed in the recesses 36 and in the arcuate recess 41. The device can then be pressed against the work piece such as the work piece 40 while the work piece is disposed in vertical position and the device will be caused to firmly adhere to the surface of the work piece. A suitable amount of an abrasive composition is then placed in the trough member 37 between the surface of the work piece and the collar member 46. The portion 34a of reduced thickness of the member 34 facilitates the insertion of the abrasive composition. One may then proceed with the drilling of a hole in the work piece 40 by rotating the spindle 11. Such rotation can be effected in any suitable way as by using a conventional portable electric drill which may be attached to the rear end of the spindle 11 in the same manner as shown in Fig. 1. During the drilling operation the collar member 46 picks up and urges toward the surface of the work piece on which the cutting end of the drill bit is acting the abrasive composition placed in the trough member 37 and the drilling of a hole can be readily accomplished.

Using the embodiments shown either in Figs. 1 to 4 or in Figs. 5 to 8 the drilling device can be readily separated from the work piece after a hole has been drilled therein and the drill bit has been retracted from the hole. If desired the device can be cleaned to remove adhesive plastic composition adherent thereto either by wiping with a cloth or by using a thinning solvent such as turpentine or naphtha which facilitates the removal of the plastic adhesive composition.

Any suitable type of abrasive composition may be used in the practice of this invention. For example, an abrasive powder such as that sold under the trade name "Carborundum" which is designated as No. 150 may be used with a suitable liquid vehicle such as turpentine. The abrasive composition should be fluid or semi-fluid in character so that it will flow about the cutting end of the drill bit and so that in the case of the embodiment shown in Figs. 5 to 8 it may be caused to flow upwardly and forwardly toward the end of the drill bit by the action of the collar member 46 so as to bathe the cutting end of the drill bit therewith during the drilling operation.

While this invention is described in connection with specific embodiments thereof it is to be understood that has been done for illustrative purposes and that the particular embodiments which have been described and shown on the accompanying drawings may be modified. Thus, it has been mentioned above that types of bearing and drill bit structures may be employed other than the preferred structures which have been disclosed herein and in my aforesaid application Serial No. 98,934 and Patent No. 2,496,939. While it is preferable to employ positioning member means in the form of a substantially annular member such as the member 24 comprised in the embodiment of Figs. 1 to 4 and the member 34 comprised in the embodiment of Figs. 5 to 8 the positioning member means may take other forms. For example, in the case of the embodiment shown in Figs. 5 to 8 the portions of the member 34 between the extremities of the brackets 35 might be omitted. Alternatively the portion 34a of reduced thickness of the member 34 may be omitted. However, the construction shown is regarded as preferable in affording an extremely rigid construction for holding the bearing 12 in fixed position during a drilling operation so as to maintain with a very high degree of constancy the axis of rotation of the spindle 11 and of the drill bit 10.

I claim:

1. A drilling device comprising a spindle, a drill bit secured to an end of said spindle in axial alignment therewith, a bearing in which said spindle is rotatable and relative to which said spindle is longitudinally movable during rotation thereof, positioning member means secured to said bearing in laterally disposed substantially spaced relation about the periphery of said drill bit adjacent the cutting end thereof and adapted to be held in opposed abutting relation to the surface of a work piece for determining its position and the axis of rotation of said spindle, a trough member disposed between said positioning member means and the periphery of said drill bit adjacent the cutting end thereof, and means for mounting said trough member as so disposed, said trough member presenting a terminal surface adapted to be disposed in opposed abutting relation to the surface of the work piece, and said spindle carrying a collar member rotatable therewith and disposed within said trough member which is adapted to agitate a fluid abrasive composition in said trough member so as to substantially surround the cutting end of said drill bit therewith when said spindle and said drill bit are rotated while disposed in horizontal position during the drilling of a hole in the work piece.

2. A drilling device comprising a spindle, a drill bit secured to an end of said spindle in axial alignment therewith, a bearing in which said spindle is rotatable and relative to which said spindle is longitudinally movable during rotation thereof, a trough member carried by said bearing and partially surrounding said drill bit adjacent the cutting end thereof, said trough member presenting a terminal surface facing in the same direction as the cutting end of said drill bit which is adapted to abut the surface of a work piece, and an annular collar member carried by said drill bit within said trough and substantially spaced from the cutting end of said drill bit which is adapted to agitate a fluid abrasive composition contained in said trough member so as to substantially surround the cutting end of said drill bit therewith when said spindle and said drill bit are rotated while disposed in a horizontal position during a drilling operation.

3. A drilling device comprising a spindle, a drill bit secured to an end of said spindle in axial alignment therewith, a bearing in which said spindle is rotatable and relative to which said spindle is longitudinally movable during rotation thereof, a trough member partially surrounding said drill bit adjacent the cutting end thereof, means for holding said trough member disposed as aforesaid, and a collar member surrounding said drill bit in adjacent spaced relation to the cutting end of said drill bit which is rotatable with said drill bit within said trough member, said collar member having a surface facing in the direction of the cutting end of said drill bit which is substantially inclined toward the cutting end of said drill bit from adjacent the periphery of said drill bit to adjacent the periphery of said collar member.

4. A drilling device according to claim 3 wherein said surface of said collar is substantially concave.

5. A drilling device according to claim 3 wherein the terminal end of said trough member facing in the same direction as the cutting end of the drill bit is adapted for disposition in opposed abutting relation to the surface of a work piece and wherein positioning member means held in rigidly secured relation to said bearing borders said terminal end of said trough member, said positioning member means being adapted to be disposed in opposed abutting relation to the surface of the work piece for maintaining its position and the axis of rotation of said spindle and of said drill bit.

6. A drilling device comprising a spindle, a drill bit secured to an end of said spindle in axial alignment therewith, a bearing in which said spindle is rotatable and relative to which said spindle is longitudinally movable during rotation thereof, and positioning means rigidly secured to said bearing, said positioning means comprising a positioning member presenting a substantially flat surface adapted to be held in opposed relation to the surface of a work piece and disposed about said drill bit in substantially spaced relation therewith adjacent the plane of the cutting end thereof, bracket means rigidly connecting said bearing and said positioning member with said surface of said member in a plane that is normal to the axis of said drill bit, said positioning member being composed of structurally substantially rigid material having recess means therein that penetrates inwardly from said substantially flat surface, and said recess means being filled with plastic adhesive composition so that said plastic adhesive composition protrudes from said recess means for effecting adherence between a work piece and said positioning member upon pressing said plastic adhesive composition between said work piece and said recess means in said surface of said positioning member.

References Cited in the file of this patent

UNITED STATES PATENTS

| Number | Name | Date |
|---|---|---|
| 79,608 | Stanton | July 7, 1868 |
| 103,912 | Mitchell | June 7, 1870 |
| 1,857,748 | Walker | May 10, 1932 |
| 1,902,055 | Beste | Mar. 21, 1933 |
| 2,151,205 | Hawn | Mar. 21, 1939 |
| 2,496,939 | Gonzalez | Feb. 7, 1950 |